United States Patent
Smith et al.

(10) Patent No.: US 12,164,049 B1
(45) Date of Patent: Dec. 10, 2024

(54) MITIGATION OF ANGLE OF ARRIVAL MULTIPATH VARIATIONS FOR WIRELESS LOCAL AREA NETWORK DEVICES

(71) Applicant: SR Technologies, Inc., Sunrise, FL (US)

(72) Inventors: Graham K. Smith, Boca Raton, FL (US); Mark Passler, Boca Raton, FL (US); Kyle Patrick Kelly, Palm Beach Gardens, FL (US); Ryan Busser, Fort Lauderdale, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 18/612,620

(22) Filed: Mar. 21, 2024

Related U.S. Application Data

(60) Provisional application No. 63/508,152, filed on Jun. 14, 2023.

(51) Int. Cl.
 *G01S 5/02* (2010.01)
 *H04W 84/12* (2009.01)
(52) U.S. Cl.
 CPC .......... *G01S 5/0218* (2020.05); *G01S 5/0244* (2020.05); *H04W 84/12* (2013.01)

(58) Field of Classification Search
 CPC .. G01S 3/00–74; G01S 5/0218; G01S 5/0244; G01S 5/74; G01S 5/46; H04W 84/12
 See application file for complete search history.

(56) References Cited

U.S. PATENT DOCUMENTS

| | | | |
|---|---|---|---|
| 2020/0132798 A1* | 4/2020 | Tomioka | G01S 3/50 |
| 2022/0141617 A1* | 5/2022 | Kao | G01S 5/0215 |
| | | | 455/456.1 |

* cited by examiner

*Primary Examiner* — Cassi J Galt
(74) *Attorney, Agent, or Firm* — Goodwin Procter LLP

(57) ABSTRACT

A method and apparatus for measuring confidence in the angle of arrival AOA of Wi-Fi packets, from a target station, using a switched beam antenna SBA is described. AOAs can be inaccurate due to reflections and multipaths. To assess the confidence of an AOA, each AOA is first converted to relative north, AOAt, and checked that at least M AOAs have been received in time T. If so, the standard deviation is calculated for of all the AOAs received during previous time T. If the standard deviation is less than a preset value, and the receiving station is not stationary, then the AOAt is considered to have high confidence and may be used to calculate the target station location. A vector display of the AOA uses the standard deviation to display the AOA vector as a varying length or a varying beamwidth corresponding to the standard deviation.

22 Claims, 15 Drawing Sheets

MITIGATION OF ANGLE OF ARRIVAL MULTIPATH VARIATIONS FOR WIRELESS LOCAL AREA NETWORK DEVICES

CROSS-REFERENCE TO RELATED APPLICATION

This application is related to and claims priority to U.S. Provisional Patent Application Ser. No. 63/508,152, filed Jun. 14, 2023, entitled MITIGATION OF ANGLE OF ARRIVAL MULTIPATH VARIATIONS FOR WIRELESS LOCAL AREANETWORK DEVICES, the entirety of which is incorporated herein by reference.

TECHNICAL FIELD

The present disclosure relates to geo-location of wireless devices, and in particular to a method, device and system for the measurement of angle of arrival (AOA) of wireless local area network (WLAN) devices.

BACKGROUND

Initially, it is noted that Institute of Electrical and Electronics Engineers (IEEE) Standard 802.11-2020 is used as the base reference for disclosures used herein, the entire contents of which are incorporated herein by reference. The IEEE 802.11-2020 Standard is commonly referred to as "Wi-Fi" and is referred to as such herein. A Wi-Fi station is referred herein as an STA.

Angle of arrival (AOA) of a signal is the direction from which the signal is received. The AOA of the signals received by STA A from STA B will be the direction of STA B relative to STA A. STA A may transmit ranging signals to STA B in order to stimulate STA B to transmit response signals back to STA A such that STA A can measure the AOA.

FIG. 1 is a diagram that describes a method that may be used for STA A 100 to transmit ranging packets 112 to STA B 105 in order to stimulate STA B 105 to transmit response packets 124 back to STA A 100. Time axis 110 refers to the time axis for STA A 100 and time axis 120 refers to the time axis for STA B 105. At time T1 111, STA A 100 transmits a ranging packet 112 to STA B 105. Ranging packet 112 is received at STA B 105 at time T2 113. STA B 105 then transmits a response packet 124 at time T3 123 after a turnaround time 122. At time T4 114, STA A 100 receives the response packet 124 from STA B 105. The packet exchange may be any pair of packets where an automatic response packet is sent. Commonly used packets in Wi-Fi include an request to send/clear to send (RTS/CTS) exchange and a Data (null)/acknowledgement (Ack) exchange.

The angle of arrival (AOA) of a signal may be measured using a switched beam antenna (SBA). By selecting individual antennas, or groups of antennas, an SBA can be configured to be a directional antenna of variable beamwidths. Using an SBA to measure AOA is known. The basic method to record an AOA using an SBA is to measure received signal strength and determine the antenna direction with the highest signal strength. Due to the nature of radio propagation, the received signal strength varies from packet to packet and in order to measure an accurate signal strength, on each antenna selection, a number of packets may be received and then the average received signal strength determined. Hence, a basic SBA scheme may include selecting an antenna, transmitting a burst of ranging packets 112, recording the individual received signal strengths of response packets 124 and averaging the signal strengths for each burst. This sequence may then be repeated over a selection of antennas. For example, three antennas may be selected in turn and the received average signal strength determined for each antenna. The direction of the antenna with the highest average received signal strength is reported as the AOA. Based upon which antenna of the three had the highest received signal strength, a new set of three antennas may be selected and the process repeated.

FIG. 2 is an example diagram that describes the problem of reflections and multipath when measuring AOA. STA A 100 is contained in a vehicle which is initially at location 201. STA B 105 is located behind obstruction 210. The direct path 220 for the response packet 124 from STA B 105 is blocked by obstruction 210 but STA A 100, can receive the response packet 124 via path 221, as it is reflected off obstruction 215. In this case, the packet is received at the SBA 200 associated with STA A 100, at an AOA that is inaccurate. Similarly, when STA A 100 is at location 202, the direct path 225 for the response packet 124 is still blocked by obstruction 210 and the received signal at SBA 200 is via the reflected path 226, off obstruction 215. When STA A 100 is at location 203, the response packet 124 is received via the direct path 230 and in this case the AOA is correct. Hence, as STA A 100 moves from location 201 to locations 202 and 203, the recorded AOA will vary significantly, and it may be difficult to know which is accurate.

SUMMARY

Methods in wireless device for determining a confidence in angles of arrival (AOAs) corresponding to communication between the first wireless device and a second wireless device using a switched beam antenna (SBA)

According to one aspect, a method in a wireless device includes, for each of a plurality of beam sets: transmitting, in succession, on each beam of the beam set, a plurality of ranging signals in bursts of N transmissions, with a gap Tp between each transmission and with a wait time Tw between each burst; and receiving, in succession, on each beam of the beam set, a plurality of response signals. The method also includes determining an AOA of a beam among the beams of the beam set for which a highest average signal strength of response signals is received, together with a time t, and a location and heading of the WD. The method also includes determining an AOA set of zero or more of the determined AOAs for the plurality of beam sets received in a time interval T. The method also includes, when the AOA set includes at least a number M of AOAs and the WD is in motion, comparing a standard deviation of the AOAs in the AOA set to a threshold, Dmax. The method also includes when the standard deviation of the AOAs in the AOA set is less than the threshold Dmax, then reporting each of at least one AOA in the AOA set together with an associated confidence level, the associated confidence level being based at least in part on the standard deviation of the AOA set.

According to another aspect, a first wireless device (WD) is configured to determine a confidence in angles of arrival (AOA) corresponding to communication between the first wireless device and a second wireless device using a switched beam antenna (SBA). The first wireless device includes a radio transmitter and receiver configured to, for each of a plurality of beam sets: transmit, in succession, on each beam of the beam set, a plurality of ranging signals in bursts of N transmissions, with a gap Tp between each transmission and with a wait time Tw between each burst;

and receive, in succession, on each beam of the beam set, a plurality of response signals. The first wireless device includes processing circuitry configured to, for each of the plurality of beam sets, determine an AOA of a beam among the beams of the beam set for which a highest average signal strength of response signals is received, together with a time t, and a location and heading of the WD. The processing circuitry is also configured to determine an AOA set of zero or more of the determined AOAs for the plurality of beam sets received in a time interval T. When the AOA set includes at least a number M of AOAs and the WD is in motion, the processing circuitry is configured compare a standard deviation of the AOAs in the AOA set to a threshold, Dmax. When the standard deviation of the AOAs in the AOA set is less than the threshold Dmax, the processing circuitry is configured to report each of at least one AOA in the AOA set together with an associated confidence level, the associated confidence level being based at least in part on the standard deviation of the AOA set.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

A method and apparatus are disclosed that determine a confidence for the measured AOAs so as to mitigate the effects on the AOA measurements due to reflections and multipath of the received signals.

Figure 3:
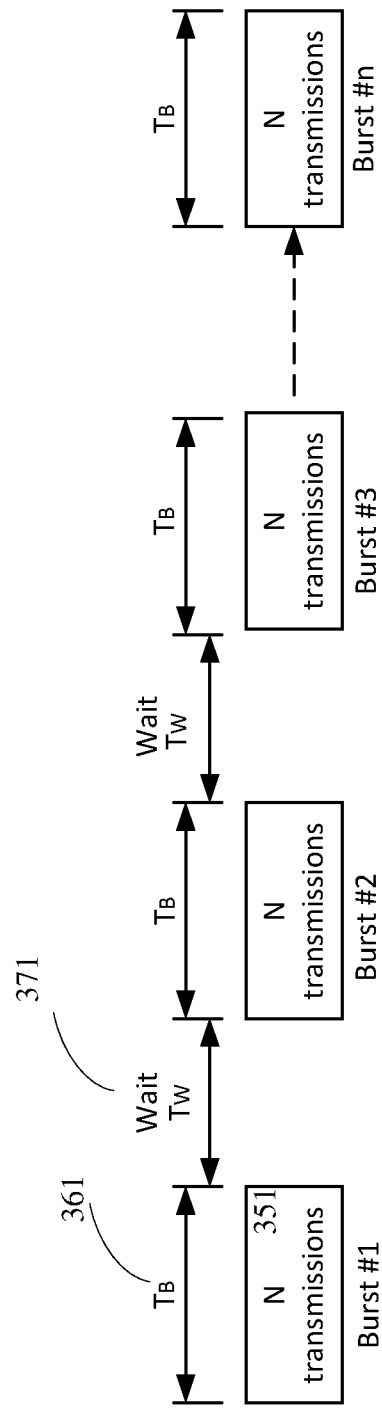
FIG. 3 is a timing diagram of a series of bursts of transmissions of the ranging packets.

In order to determine an accurate received signal strength, the average received signal strength may be measured for a number N of received response packets 124. Referring again to the drawing figures in which like reference designators refer to like elements, FIG. 3 is an example timing diagram of a series of bursts of transmissions of the ranging packets 112. In some embodiments, a "burst", 351, consisting of a preset number N of transmissions of packets 112 from STA A 100, may be sent followed by a "wait" period, Tw 371. This sequence may continue until a command may be issued to terminate the transmissions. Within each burst, each of the N transmissions may be separated by a preset time, Tp. The duration $T_B$ 361 of each burst will therefore be N Tp. For example, a burst may consist of 64 transmissions of packets 212 from STA A 100, the start of each transmission, say, 1 ms apart, followed by a wait period of, say, 30 ms after which another burst of 64 transmissions may be sent. In this example, the duration of each burst plus wait time will be 94 ms.

The angle of arrival AOA of a signal may be measured using a switched beam antenna, SBA. A more complete understanding of the present embodiments, and the attendant advantages and features thereof, will be more readily understood by first describing the basics of an example SBA.

Figure 4:
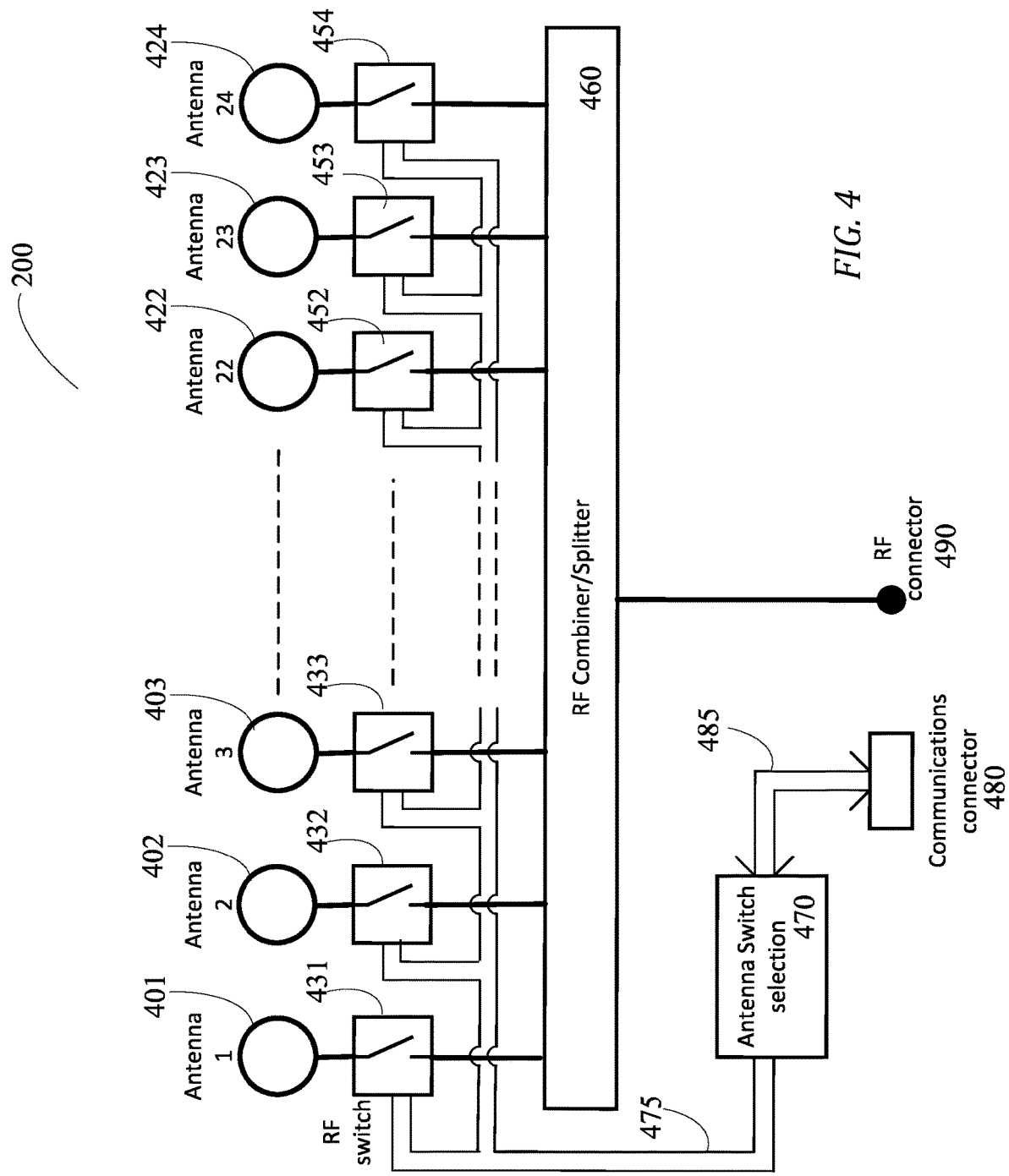
FIG. 4 is a block schematic diagram of an example of a switched beam antenna (SBA)

FIG. 4 is a block schematic diagram of an example of an SBA 200. In this example, SBA 200 includes 24 individual antennas 401 to 424. Each antenna 401 to 424 is connected to a radio frequency, RF, switch 431 to 454 respectively. The RF switches 431 to 454 are connected to an RF combiner/splitter 460 which is connected to a single RF connector 490. The RF switches 431 to 454 are controlled by the antenna switch selection unit 470 over a data bus 475. External commands are sent via the communications connector 480 which is connected to the antenna switch selection unit via data bus 485. External commands sent via communication connector 480 can cause one or more antennas 401 to 424 to be selected by causing the respective RF switch(es) 431 to 454 to be selected. For example, different commands may be used to either cause a single antenna to be selected, or a number of antennas to be selected so as to form beams with various beamwidths.

Figure 5:
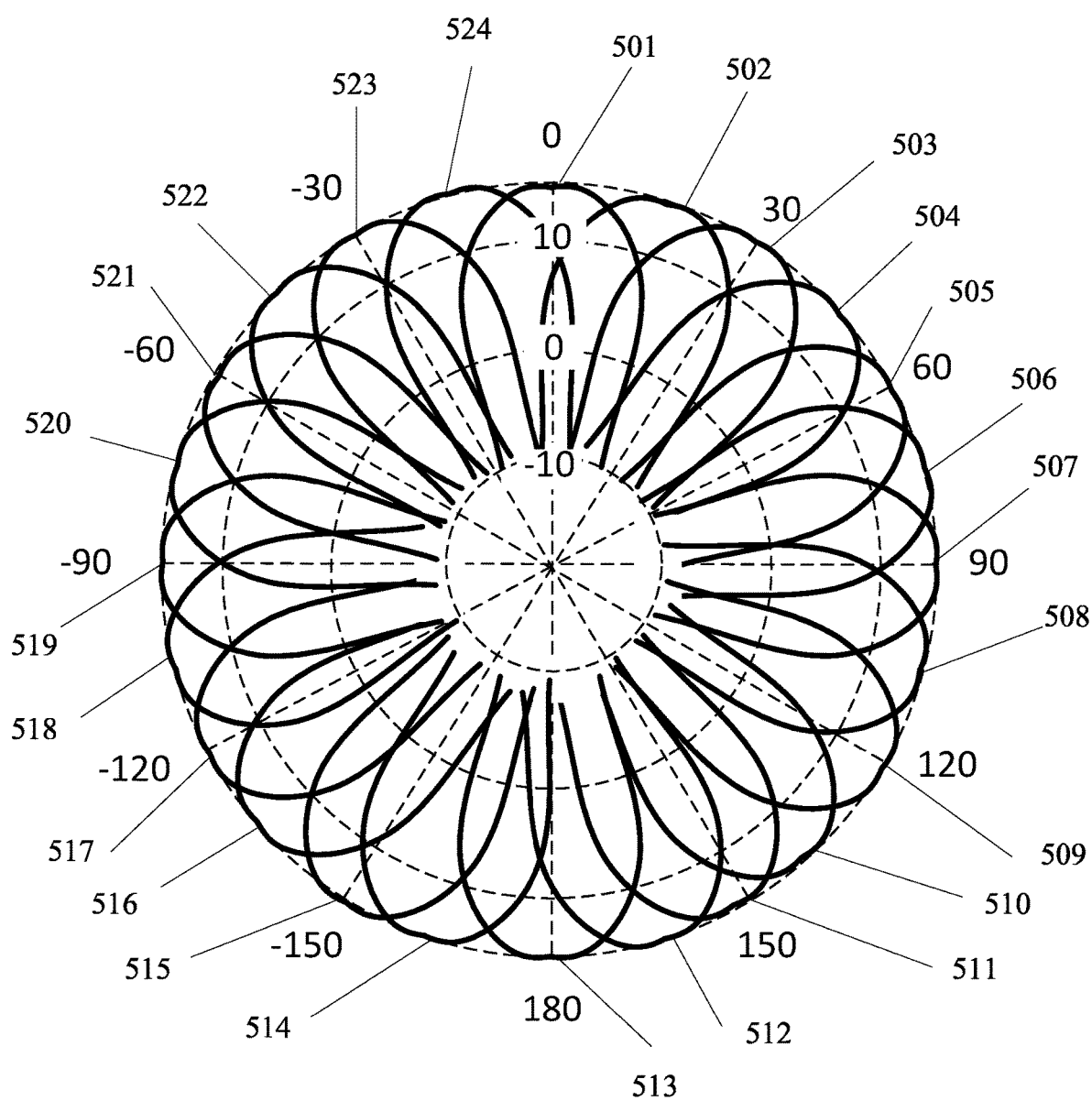
FIG. 5 is a diagram showing the 24 individual beams corresponding to antennas when arranged in a circle, each beam at 15 degrees intervals.

FIG. 5 is a diagram showing the 24 individual beams 501 to 524 corresponding to antennas 401 to 424 when arranged in a circle, each beam at 15 degrees intervals. By inputting the appropriate command at communications connector 480, any of the 24 individual beams may be selected. Also, by inputting other commands at communications connector 480, selections of antennas may be selected.

In some embodiments, STA A 100 is located on a mobile platform and STA B 105 is in a fixed location. In some embodiments, STA A 100, is located in a fixed location and STA B 105 is mobile. In some embodiments, both STA A 100, and STA B 105 are mobile.

A more complete understanding of the present embodiments, and the attendant advantages and features thereof, will be more readily understood by first generally describing a method of controlling the SBA 200 antenna selection, the transmission of the bursts 351, receptions from the target, STA B 105, and the measurement of the received signals at STA A 100.

Figure 6:
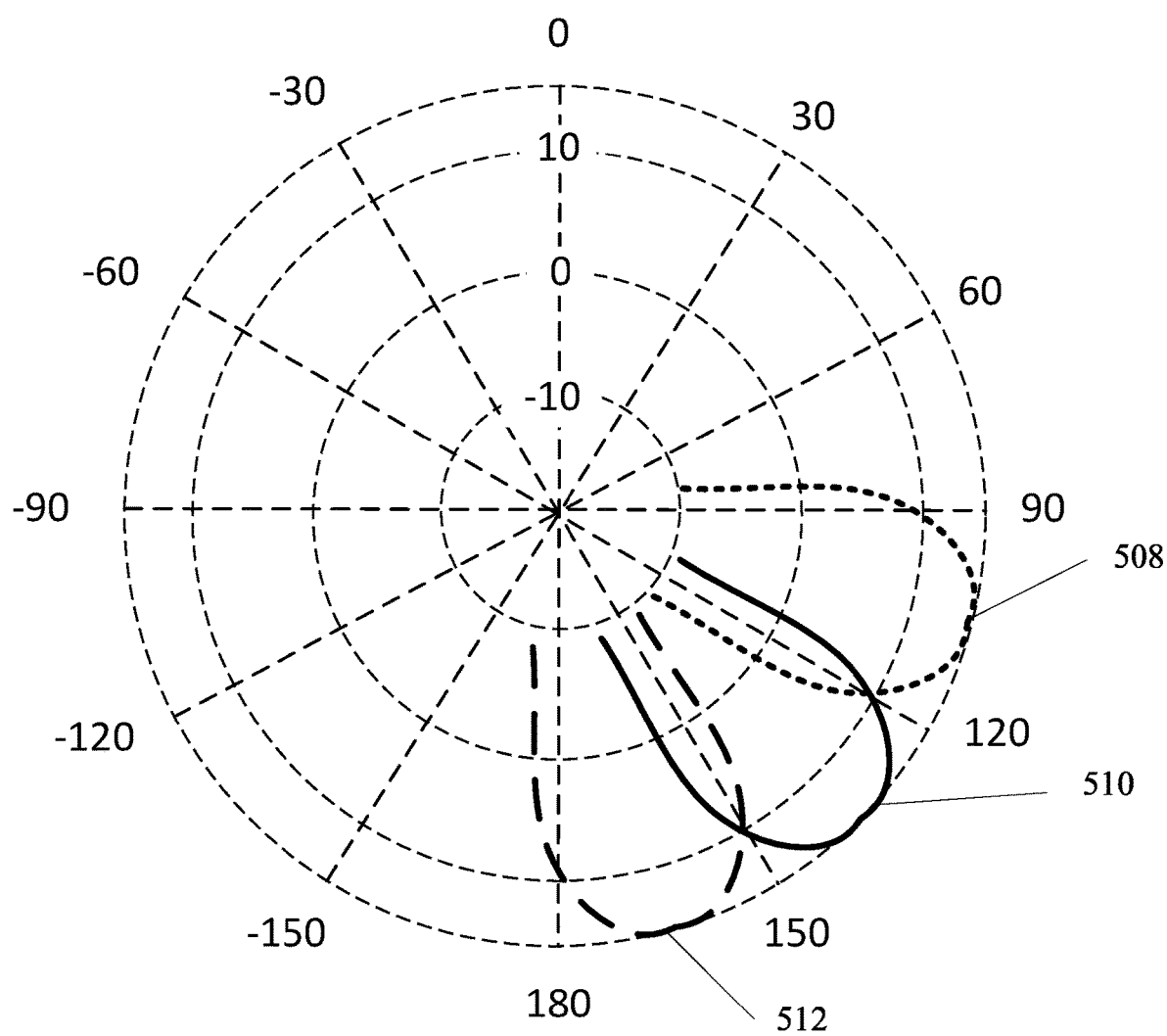
FIG. 6 is a diagram of an example of the three individual beams that may be selected.

FIG. 6 is a diagram of an example of the three individual beams, 508, 510 and 512 that may be selected. STA A 100, may select, in turn, beams 508, 510, and 512, transmitting a burst 351 of N transmission ranging packets 112 on each beam, and noting the average signal strength of the received packets 124 from STA B 105, per beam. After each sequence of sending bursts on each beam, the beam with the best average signal strength may be noted and recorded as the AOA. For example, assume that beam 510 has the best average signal level, i.e., the center beam of the sequence. In this case, STA A 100 will continue to switch beams in the same sequence for the next set of three bursts 351. If, however, the beam with the highest average signal strength is, or becomes beam 508, then STA A 100 may select, in turn, beams 507, 509, 511, i.e., the beam sequence selection is shifted -15 degrees. Similarly, if the beam with the highest average signal strength is, or becomes beam 512, then STA A 100, may then select, in turn, beams 509, 511, 513, i.e., the beam selection sequence is shifted +15 degrees. This selection sequence scheme of changing by zero, +15 or -15 degrees, continues. By this example method, after each selection of three beams, transmitting a burst 351 on each beam, the beam with the maximum averaged signal strength is reported as the AOA corresponding to the direction of STA B 105 relative to STA A 100.

Figure 2:
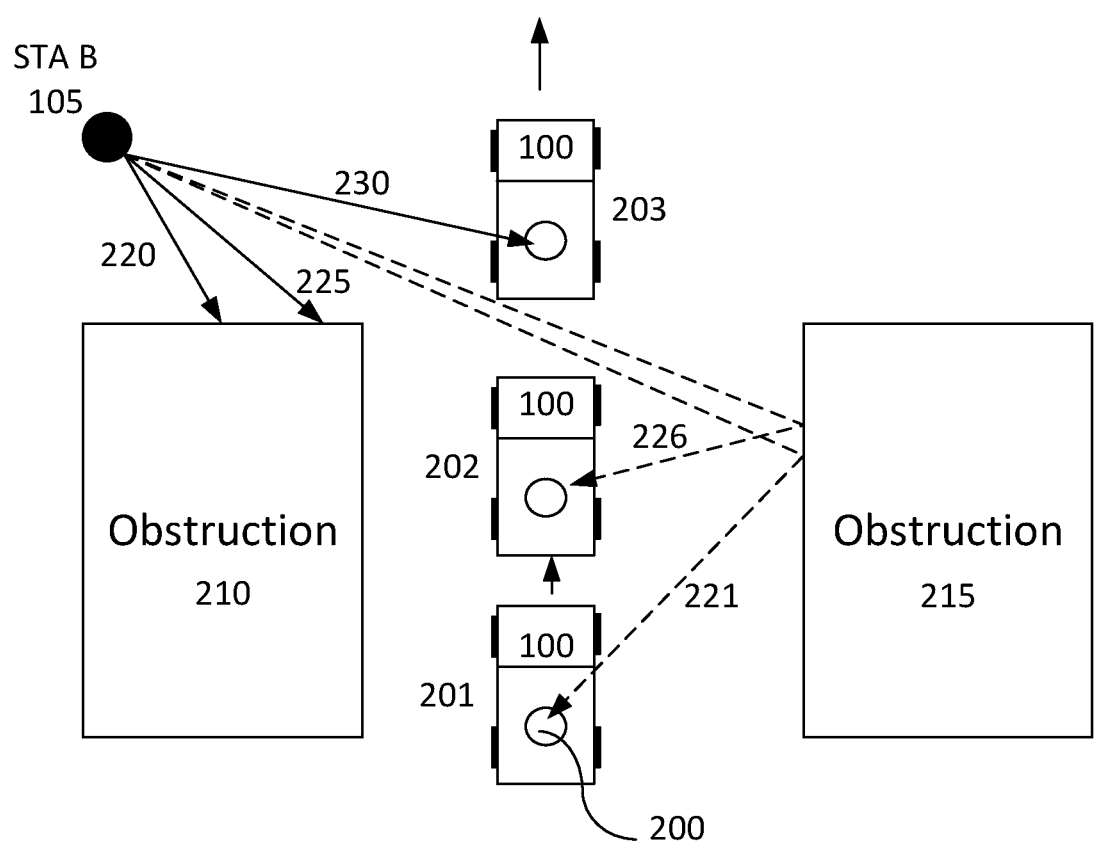
FIG. 2 is an example diagram that describes the problem of reflections and multipath when measuring AOA.

With the example of bursts 351 discussed above with respect to FIG. 3, the time to switch between three antennas and determine an AOA is 3×94 ms=282 ms. In other words, an AOA may be produced every 282 ms. As discussed above with respect to FIG. 2, because of reflections and multipath propagation, the AOA may or may not be accurate.

Figure 7:
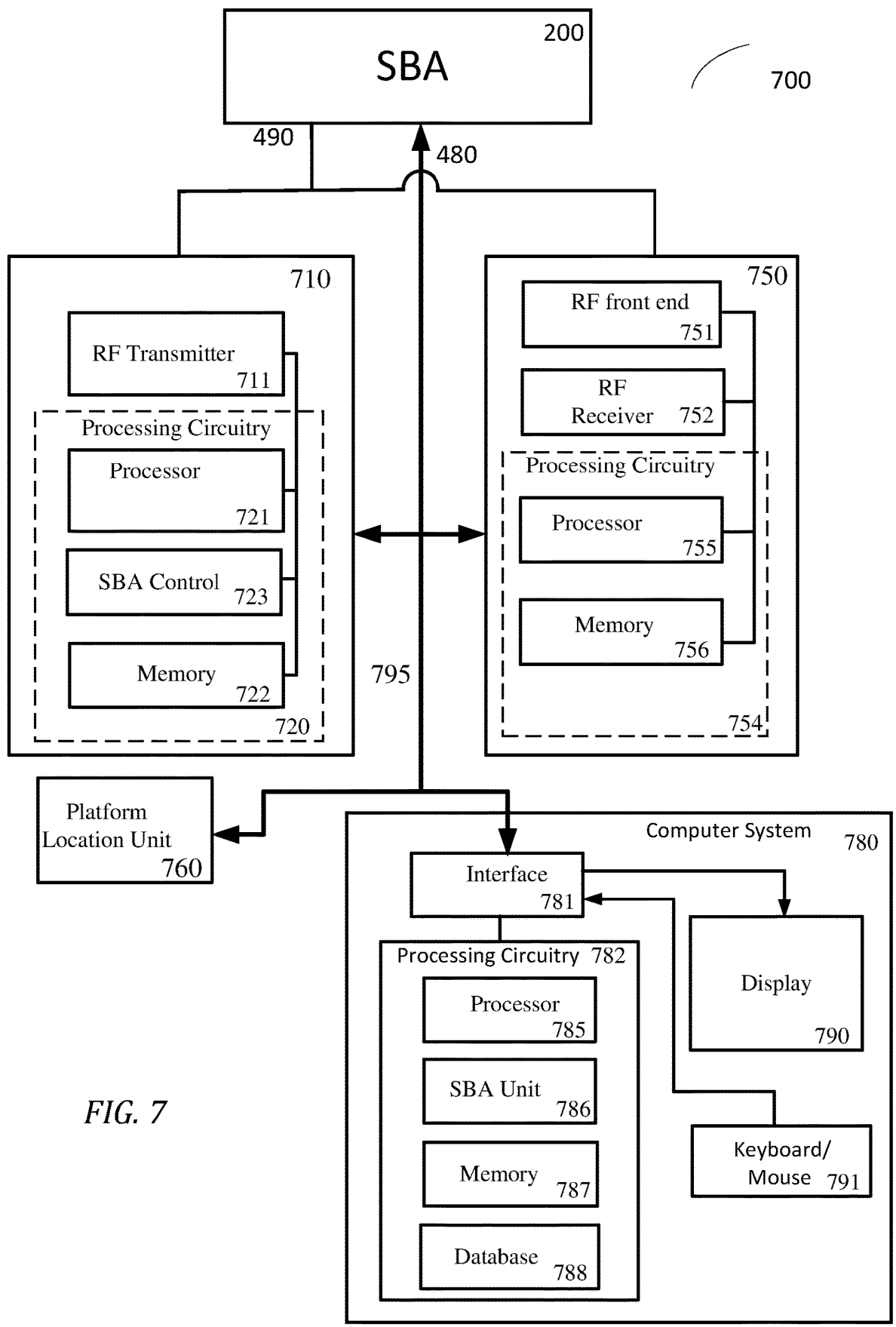
FIG. 7 illustrates a block diagram of an example wireless communication device which, according to an embodiment of the disclosure, may be used as or as part of the wireless device STA A.

FIG. 7 illustrates a block diagram of an example wireless communication device 700 which may be used as or as part of the wireless device STA A 100. The wireless communication device 700 may be any device capable of wirelessly receiving signals and transmitting signals and may be configured to execute any of the methods of the IEEE 802.11-2020 Standard. Wireless communication device 700 may be one or more stations or access points, and the like. Wireless communication device 700 may be one or more wireless devices that are based upon the IEEE 802.11-2020 specification and each may be configured to act as a transmitter or a receiver. The wireless communication device 700 includes an SBA 200, wireless transmitter 710, and a wireless receiver 750. The wireless communication device 700 may also include a platform location unit 760 and a computer system 780 which are interconnected to the wireless transmitter 710, the wireless receiver 750 and the SBA 200 by a data bus 795. In some embodiments, the connection to the SBA 200 via communications connector 480 may be via a separate data bus from the processing circuitry that is used to control the SBA 200, i.e., processing circuitry 720 or the computer system 780.

In some embodiments, the wireless transmitter 710 includes an RF transmitter 711 and processing circuitry 720 that includes processor 721, memory unit 722, and an SBA control unit 723. The RF transmitter 711 may perform the functions of modulation, as described in IEEE 802.11-2020 and amplification for the transmission of the Wi-Fi packets via RF connector 480 and SBA 200. In some embodiments the processing circuitry 720 and/or the processor 721 may include integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments the functions of the RF transmitter 711 may be performed by the processing circuitry 720. The processing circuitry 720 may be configured to control any of the methods and/or processes described herein and/or to cause such methods, and/or processes to be performed, e.g., by the RF transmitter 711. The memory unit 722 may be configured to store data, programmatic software code and/or other information described herein. In some embodiments, the software may include instructions that, when executed by the processing circuitry 720, causes the processing circuitry 720 to perform the processes described herein with respect to the wireless transmitter 710. The SBA control unit may perform the processes that control the antenna selection of the SBA 200.

In some embodiments, the wireless receiver 750 includes an RF front end 751, an RF receiver 752, processing circuitry 754 (that includes a processor 755 and a memory unit 756). The RF front end 751 may perform the usual functions of an RF receiver front end such as low noise amplification, filtering and frequency down conversion so as to condition the received signal suitable for inputting to the RF receiver 752. The RF receiver 752 may perform the functions of demodulation of the Wi-Fi packet and to measure the signal strength of received packets. As discussed above with reference to FIGS. 4, 5 and 6, the signal strength of the received response packets 124 on the selected antennas of the SBA 200 are used to select the best antenna. The processor circuitry 754 may be used to record the received signal strengths and average them over a burst 351. The resulting averaged signal strengths may then be passed to the SBA control unit 723 where the control of the selected SBA antennas is carried out.

In some embodiments, the RF receiver 752 and/or the processing circuitry 754 may include integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments, the functions of the RF receiver 752 may be performed by the processing circuitry 754. The processing circuitry 754 may be configured to control any of the methods and/or processes described herein and/or to cause such methods, and/or processes to be performed, e.g., by the wireless receiver 750. The memory unit 756 is configured to store data, programmatic software code and/or other information described herein. In some embodiments, the software may include instructions that, when executed by the processing circuitry 754, causes the processing circuitry 754 to perform the processes described herein with respect to the wireless receiver 750.

In some embodiments, the wireless receiver 750 may be configured to measure and monitor an input signal's attribute, such as one or more of a signal transmitted by wireless transmitter 710, data and control packets, and the response signal, including control packets, transmitted by an access point or station that may be based upon the IEEE 802.11-2020 Standard. Such packets may include data null, ACK, RTS and CTS packets. The memory unit 756 may store instructions for executing any method mentioned in the IEEE 802.11-2020 Standard, input signals, and results of processing of the processor 755, signals to be outputted. Processing circuitry 754 may output to the SBA control unit 723, via data bus 795, the attributes of the received response packets 124 such as average signal strength. Processing circuitry 720 and/or 754 may output to computer system 780 via data bus 795 the selected antenna beam, i.e., the AOA. Alternatively processing circuitry 720 and/or 754 may output to computer system 780 the individual antenna selections and the accompanying signal strengths and the determination of the AOA is carried out in the computer system 780.

In some embodiments, the RF transmitter 711 may be configured to transmit ranging packets 112 and the processing circuitry 720 may be configured to prepare the transmitted signal attributes based upon the IEEE 802.11-2020 Standard. Such transmitted ranging packets may include data packets, control packets and management packets. Such control packets may include RTS packets. The memory unit 722 may store instructions for executing any method mentioned in the specification, input signals, and results of processing of the processor 721, signals to be outputted and the like. The SBA control unit 723 may control the antenna selection of the SBA 200 which may, in turn, be based upon received signal strength measurements received from the processing circuitry 754 in the wireless receiver 750.

In some embodiments, the wireless receiver 750 may be configured to receive the transmissions of another target station, e.g., STA B 105, and the processing circuitry 754 may be configured to monitor an attribute of the transmissions of the other wireless communication device and determine the value of the signal strengths of packets from the other wireless communication device.

In some embodiments, the wireless transmitter 710 may be configured to transmit bursts 351 of ranging packets 112 to another wireless communication device, as described in FIG. 3, and the processor 721 may be configured to prepare the attributes of the ranging packet 112 to be transmitted. Processor 721 may also be configured to set the timing between each ranging packet 112 transmission, the number N of ranging packet 112 transmissions within each burst, the wait time Tw 371 between bursts, as well as the start and stop times for the sequence of bursts. During the wait time Tw 371, the SBA control unit 723 in processing circuitry 720 may also be configured to set the antenna switches 431 to 454 in the SBA 200 so as to select an antenna beam for the next burst of transmissions.

In some embodiments, a computer system 780 may be used to control the operations of the wireless communication device 700 and in particular the wireless transmitter 710 and wireless receiver 750. The computer system 780 may include an interface 781. Interface 781 may contain an Ethernet connection to the data bus 795, the connection to a display 790, a connection to a keyboard/mouse 791 as well as interfacing to the processing circuitry 782. In some embodiments, the processing circuitry 782 may include a processor 785, SBA unit 786, memory 787 and a database 788. The database 788 may contain the ground mapping information of the area of interest. The keyboard/mouse 791 and display 790 may be used by an operator to select the attributes of the target, STA B 105, and processing circuitry 782 may, via data bus 795 to processing circuitry 720 and/or 754, control the start and stop of the transmissions of ranging packets 112 and interpret the resulting AOAs. The processor 785 and memory 787 may be used to carry out processes for the geo-location of the target STA B 105, using the AOAs as reported by processing circuitry 720 and/or 724 in the wireless transmitter 710 and wireless receiver 750, the information on the position of the wireless communication device 700, i.e., STA A 100, derived from the platform location unit 760, plus information on the target STA B 105 which may be inputted using the keyboard/mouse 791.

In some embodiments, the computer system 780 may include integrated circuitry for processing and/or control, e.g., one or more processors and/or processor cores and/or FPGAs (Field Programmable Gate Array) and/or ASICs (Application Specific Integrated Circuitry) configured to execute programmatic software instructions and may include a memory unit to execute programmatic code stored in the memory 787 of the computer system 780 or another device. It is also noted that the elements of the wireless communication device 700 can be included in a single physical device/housing or can be distributed among several different physical devices/housings.

In some embodiments, a platform location unit 760 may be used to input, via the data bus 795, to the computer system 780 and/or the processing circuitry 720 and/or 754 the location and heading of the platform that is carrying the wireless communication device 700. The platform location unit 760 may include navigation equipment such as a GPS receiver and/or a gyro and may provide both the location and heading of the wireless communication device 700 to the computer system 780, and processing circuitries 720 and 754. The location and heading of the wireless communication device 700, together with the antenna selections of the SBA 200 may also be used by the computer system 780 to determine if the wireless communication device 700 (STA A 100) is stationary or moving and to calculate and display the location of the target, STA B 105. Geo-location of a device using AoAs and location of the wireless communication device is known.

Figure 8:
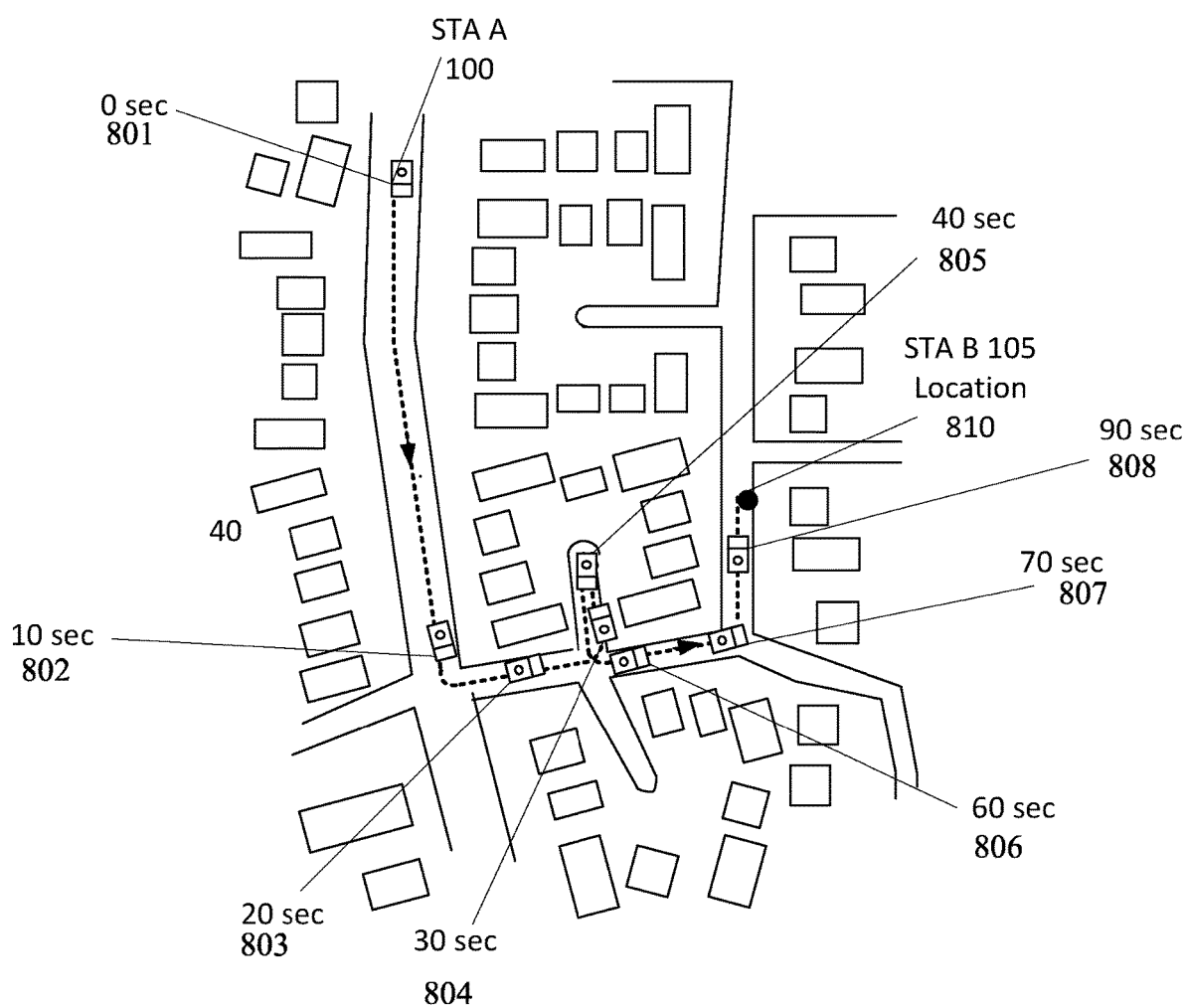
FIG. 8 is a diagram of an example of the route of STA A measuring AOAs with respect to STA B which is located at position 810.

FIG. 8 is a diagram of an example of a route of STA A 100 measuring AOAs with respect to STA B 105 which is located at position 810. STA A 100 starts at position 801. After 10 seconds, STA A 100 is at position 802. After 20, 30, 40, 60, 70 and 90 seconds, STA A 100 is at positions 802, 803, 804, 805, 806, 807 and 808, respectively. For much of the route the direct propagation path from STA B 105 is obstructed.

Figure 9:
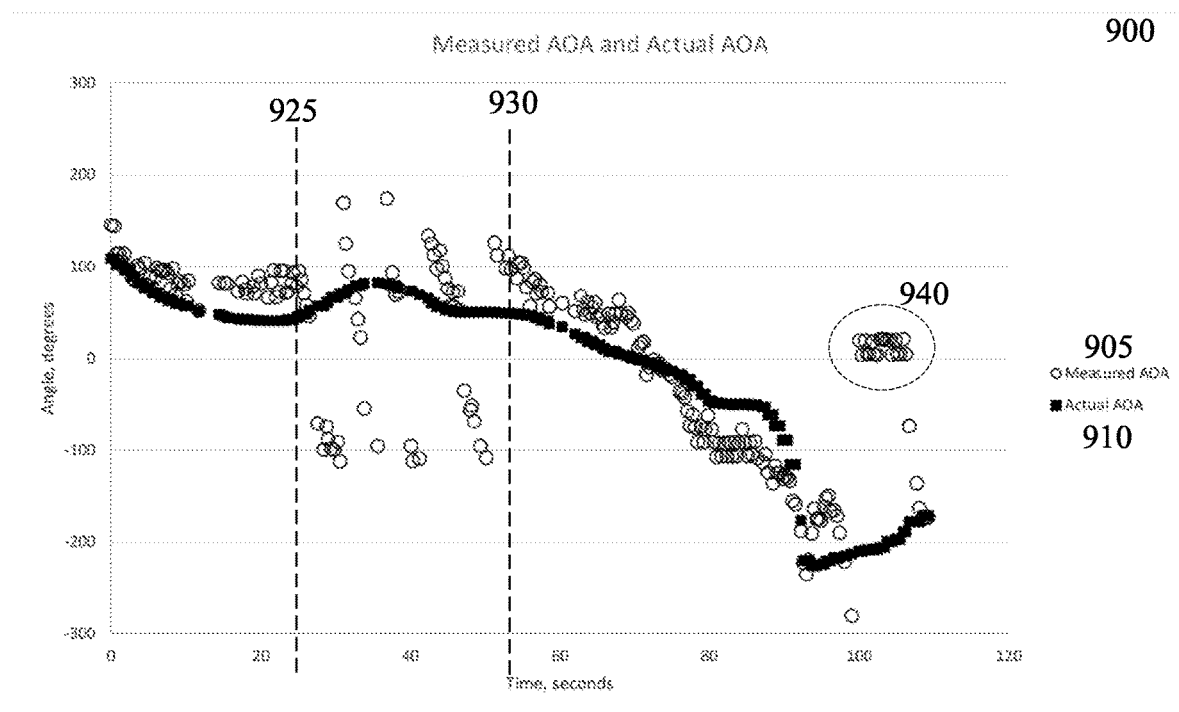
FIG. 9 is a graph of the measured AOAs and the actual AOAs, with respect to time, for the example route as shown in FIG. 8.

FIG. 9 is an example graph 900 of the measured AOAs 905 and the actual AOAs 910, with respect to time, for the example route as shown in FIG. 8. The AOAs 905 and 910 are shown relative to North. It may be observed that between the time of 25 seconds, 925, and 55 seconds, 930, the measured AOAs 905 vary significantly and are inaccurate. Other examples of inaccurate AOA may also be observed, for example the cluster of AOAs 940 at the end of the run.

Referring again to FIG. 2, the causes of inaccurate measured AOAs may be due to reflections/multipath. If STA A 100 is moving, then the AOA measurements of a reflected signal may be observed to be varying more than what might be expected. In addition, if STA A 100 is stationary, then the AOA is also unreliable. For example, referring again to FIG. 2, if STA A 100 is stationary at location 201, then an unvarying AOA may be recorded as determined in the wrong direction due to the reflected path 221.

Methods are disclosed that include first measuring the temporal deviation of AOAs and also determining whether STA A 100 is moving. The AOA is filtered out if the deviation is above a limit or if the STA A 100 is not moving. The disclosed method includes first defining a time period T. Then, for each AOA, the variance of the AOAs received over the previous time T is calculated and the standard deviation determined. It is then checked if STA A 100 is moving during time T. If the standard deviation is above a limit, or if STA A is not moving, then it is assumed that the AOA is unreliable due to reflections and multipath and the AOA is eliminated from the calculation of the target location. A further filter, based upon a minimum number, M, of AOAs in time period T, may be applied.

Hence, as each AOA is recorded, if the number of AOAs received over the last T seconds is at least a preset number, M, then the variance of the AOAs is calculated, and the standard deviation derived. If the standard deviation is greater than a preset value, Dmax, then that AOA is deemed to be unreliable and dropped. An additional "movement" filter may be applied, i.e., if STA A 100 is not moving, then the AOA is also deemed unreliable.

Calculating the variance and standard deviation of the AOAs is not straightforward because of the roll over effect of the reported angles. For example, AOAs of 355 degrees and 5 degrees are in fact close, 10 degrees apart, but could be read as being 350 degrees apart. An exact calculation of the standard deviation is as follows:

In time T, assume that N AOA's, A, are recorded, i.e., $A_n = \{A_1, A_2, \ldots, A_N\}$ $$\text{Let } A = \text{ATAN}\left[\frac{\sum_1^N \sin A_n}{\sum_1^N \cos A_n}\right] \quad (1)$$

If $\sum_1^N \sin A_n < 0$ and $\sum_1^N \cos A_n < 0$ then $A_{ave} = A - \pi$ \quad (2)

If $\sum_1^N \sin A_n > 0$ and $\sum_1^N \cos A_n < 0$ then $A_{ave} = A + \pi$

If $\sum_1^N \sin A_n < 0$ and $\sum_1^N \cos A_n > 0$ then $A_{ave} = A$

If $\sum_1^N \sin A_n > 0$ and $\sum_1^N \cos A_n > 0$ then $A_{ave} = A$

For n=1 to N

If $(A_n - A_{ave}) > \pi$, $(A_n - A_{ave}) = (A_n - A_{ave}) - 2\pi$ \quad (3)

Else $(A_n - A_{ave}) = (A_n - A_{ave})$

If $(A_n - A_{ave}) < -\pi$, $(A_n - A_{ave}) = (A_n - A_{ave}) + 2\pi$

Else $(A_n - A_{ave}) = (A_n - A_{ave})$

Then $\sigma^2 = \frac{1}{N}\sum_1^N (A_n - A_{ave})^2$ \quad (4)

and $\sigma = \sqrt{\frac{1}{N}\sum_1^N (A_n - A_{ave})^2}$

The calculation to derive the standard deviation equation (4) involves corrections to the average calculation, (1) and (2), plus a correction to the difference calculations for each AOA, (3). It may be noted that the function ATAN2 may be used in equation (1) which has the correction built in and if used, correction equations (2) are not required.

An alternative approximation is as follows:

Calculate averages $$\cos A_{ave} = \frac{1}{N}\sum_1^N \cos A_n \quad \sin A_{ave} = \frac{1}{N}\sum_1^N \sin A_n$$

Then variance of the cosines is $$\sigma_{cos}^2 = \frac{1}{N}\sum_1^N (\cos A_n - \cos A_{ave})^2 \quad (5)$$

And variance of the sines is $$\sigma_{sin}^2 = \frac{1}{N}\sum_1^N (\sin A_n - \sin A_{ave})^2 \quad (6)$$

Then $$\sigma_{approx} \approx \sqrt{\sigma_{cos}^2 + \sigma_{sin}^2} \quad (7)$$

The cosine and sine variances may also be calculated without having to first calculate the averages, using the well-known "running statistic" variance formula:

$$\sigma_{cos}^2 = \frac{1}{N}\left[\sum_1^N \cos^2 A_n - \frac{1}{N}\left(\sum_1^N (\cos A_n)^2\right)\right] \quad (8)$$

$$\sigma_{sin}^2 = \frac{1}{N}\left[\sum_1^N \sin^2 A_n - \frac{1}{N}\left(\sum_1^N (\sin A_n)^2\right)\right] \quad (9)$$

$$\sigma_{approx} \approx \sqrt{\sigma_{cos}^2 + \sigma_{sin}^2} \quad (7)$$

The method using equations (5), (6) or (8) (9) and (7) does not require any angular corrections, but equation (7) is an approximation that omits fourth order terms and above. However, the error is less than 1 degree for standard deviations up to 25 degrees. The following empirical formula (10) may be used to correct the approximate standard deviation result and provide a reasonably accurate value:

$$\sigma = 1.4\, \sigma_{approx} - 0.1 (\text{rads}) \quad (10)$$

Figure 1:
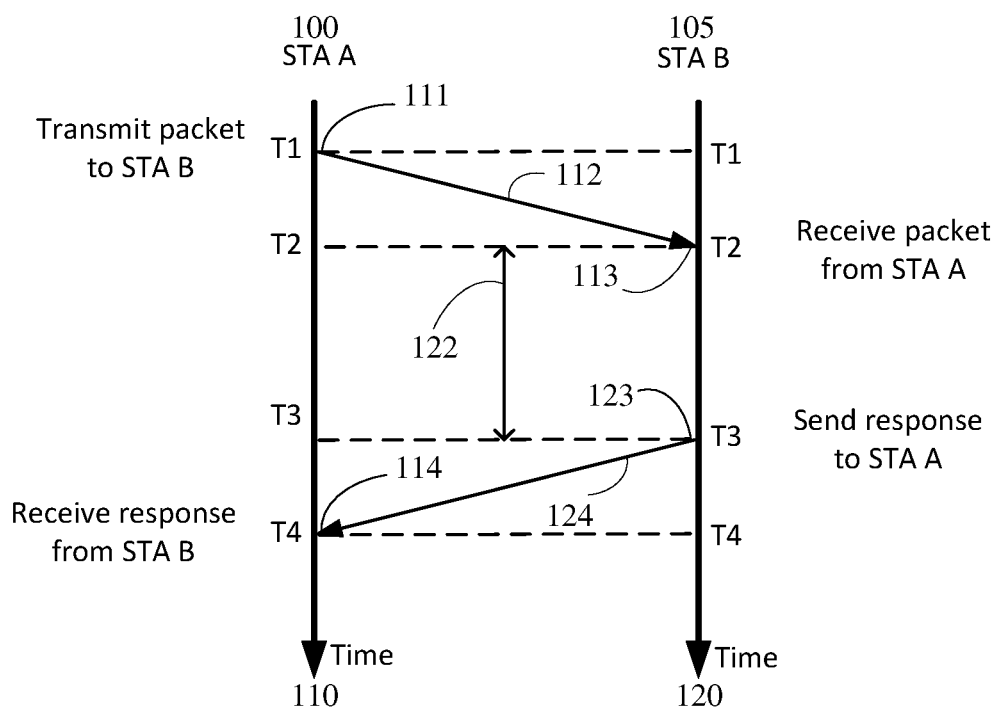
FIG. 1 is a diagram that describes a method of the present disclosure that may be used to communicate between two wireless devices, such as wireless device STA A and wireless device STA B.

For the burst 351 of ranging packets 112, as discussed above with reference to FIGS. 1 and 3, and the SBA selection scheme discussed with reference to FIGS. 4, 5, and 6, there may be up to 3.5 AOAs recorded every second. Various values for T may be used but a time T=3 seconds relates to a maximum of 10 AOAs in each time period T and is a good compromise between the number of AOAs and the expected change in AOA due to movement. A value of M=4 may then be used such that at least 4 AOAs must be received in the last 3 seconds in order to ensure that the standard deviation calculation has enough terms to be valid.

Figure 10:
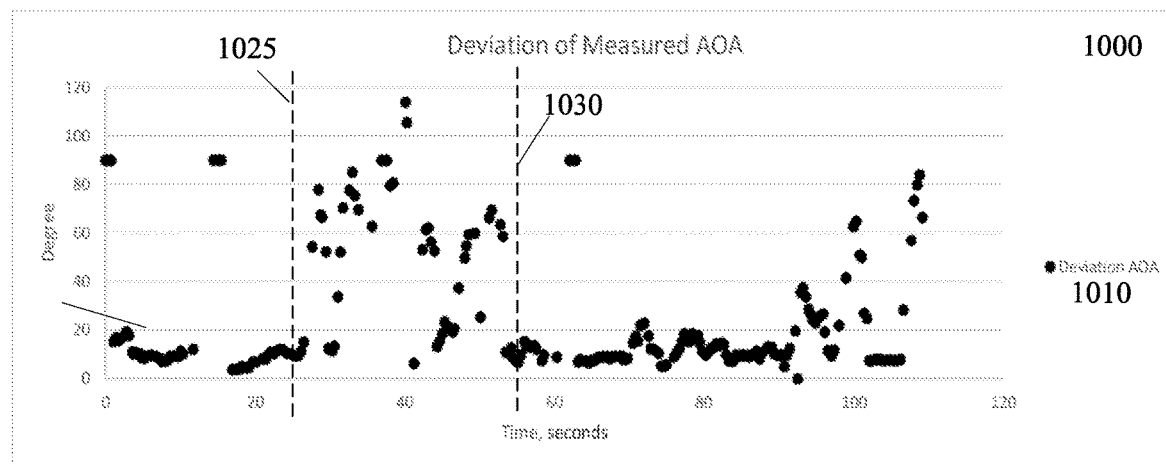
FIG. 10 is a graph of the standard deviations of the measured AOAs, as shown in FIG. 9, for the example route as shown in FIG. 8.

FIG. 10 is an example graph 1000 of the standard deviations 1010 of the measured AOAs 905, as shown in FIG. 9, for the example route as shown in FIG. 8. It was observed in FIG. 9 that between the time of 25 seconds, 925, and 55 seconds, 930, the measured AOAs 905 vary significantly and are inaccurate. In FIG. 10 it may be noted that between the time of 25 seconds, 1025, and 55 seconds, 1030, most of the standard deviations 1010 are high, i.e., above a value of 15 degrees, indicating that a high standard deviation coincides with incorrect AOAs. When using SBA 200 as described above with reference to FIGS. 4, 5, and 6, there are 24 antennas and hence, each beam is at 15 degrees spacing. A minimum value of Dmax=15 degrees may therefore be assumed but to cater for the variations in AOA due to movement, a value of Dmax=25 degrees is preferred.

Figure 11:
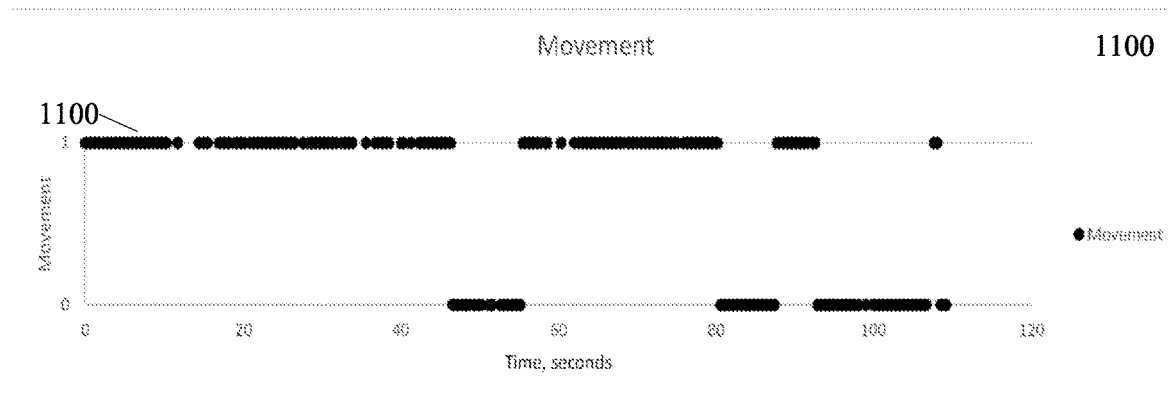
FIG. 11 is a graph of the movement of STA A for recorded AOAs during the example route as shown in FIG. 8.

FIG. 11 is an example graph 1100 of the movement of STA A 100 for recorded AOAs during the example route as shown in FIG. 8. A value of 1, 1100, indicates STA A 100 was in motion and a value of 0 indicates that STA A 100 was moving at less than 1 m/second, i.e., effectively stationary, at the time that each AOA was recorded. When STA A 100 is detected as effectively stationary, then the associated AOA is considered low confidence.

Figure 12:
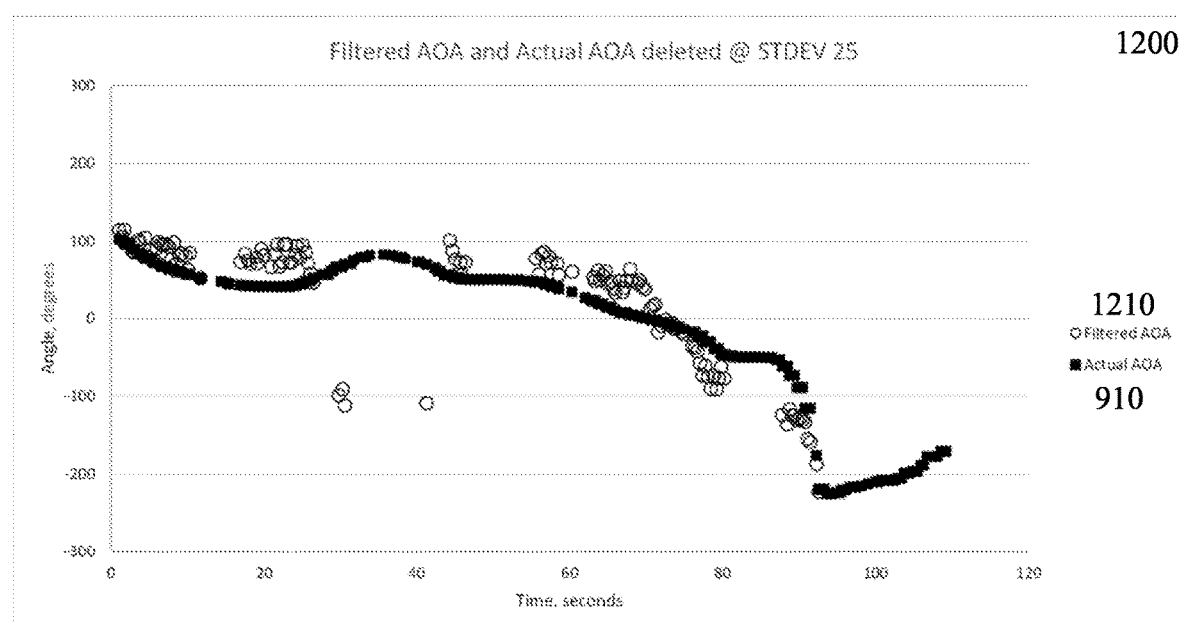
FIG. 12 is a graph of the measured and filtered AOAs and the actual AOAs, with respect to time, for the example route as shown in FIG. 8.

FIG. 12 is an example graph 1200 of the measured and filtered AOAs 1210 and the actual AOAs 910, with respect to time, for the example route as shown in FIG. 8. The measured AOAs have been included only if they pass the following three filters:
- standard deviation D of the AOAs over the last 3 seconds is 25 degrees or less;
- there are at least 4 AOAs in the last 3 seconds; and
- STA A 100 is moving at the time the AOA was recorded.

Graphs 1200 and 900 may be compared and it may be noted that most of the inaccurate AOAs have been eliminated, i.e., measured AOAs 905 that differ significantly from the actual AOAs 910. As the measured AOAs and the actual AOAs are now better aligned, as depicted in FIG. 12, it should be clear to one skilled in the art, that the resulting accuracy of the calculation of the location of the target STA B 105, based upon the filtered AOAs, is significantly improved over a location calculated using all the AOAs, as per FIG. 9.

The AOAs depicted in FIGS. 9 and 12 are relative to north. In order to carry out the standard deviation calculations the AOAs must all be relative to the same reference, i.e., north. The AOAs that are measured by the SBA 200 are relative to the heading of the platform that contains STA A 100. The heading of the platform is added to the measured AOA by the SBA in order to produce the AOA relative to north.

Referring again to FIG. 8, as the vehicle containing STA A 100 is travelling along a route, the measured AOA relative to the heading of the vehicle can be displayed to an operator riding in the vehicle. The AOA may be displayed to the operator via the user interface to the computer system 780. The standard deviation calculated for each AOA may be used as a confidence indicator on the AOA vector, i.e., direction, of the target STA B 105, as displayed to the operator. If the standard deviation is less than 25 degrees, then there is a good confidence that the AOA displayed is accurate. As the standard deviation increases, then the confidence decreases. For example, if the vehicle, STA A 100, is in an area where reflections are occurring, then the individual AOAs will vary significantly from one AOA to the next and the AOAs have high standard deviation. The display of each AOA, i.e., relative direction of the target STA B 105, may use the value of the respective standard deviation in several ways.

Figure 13:
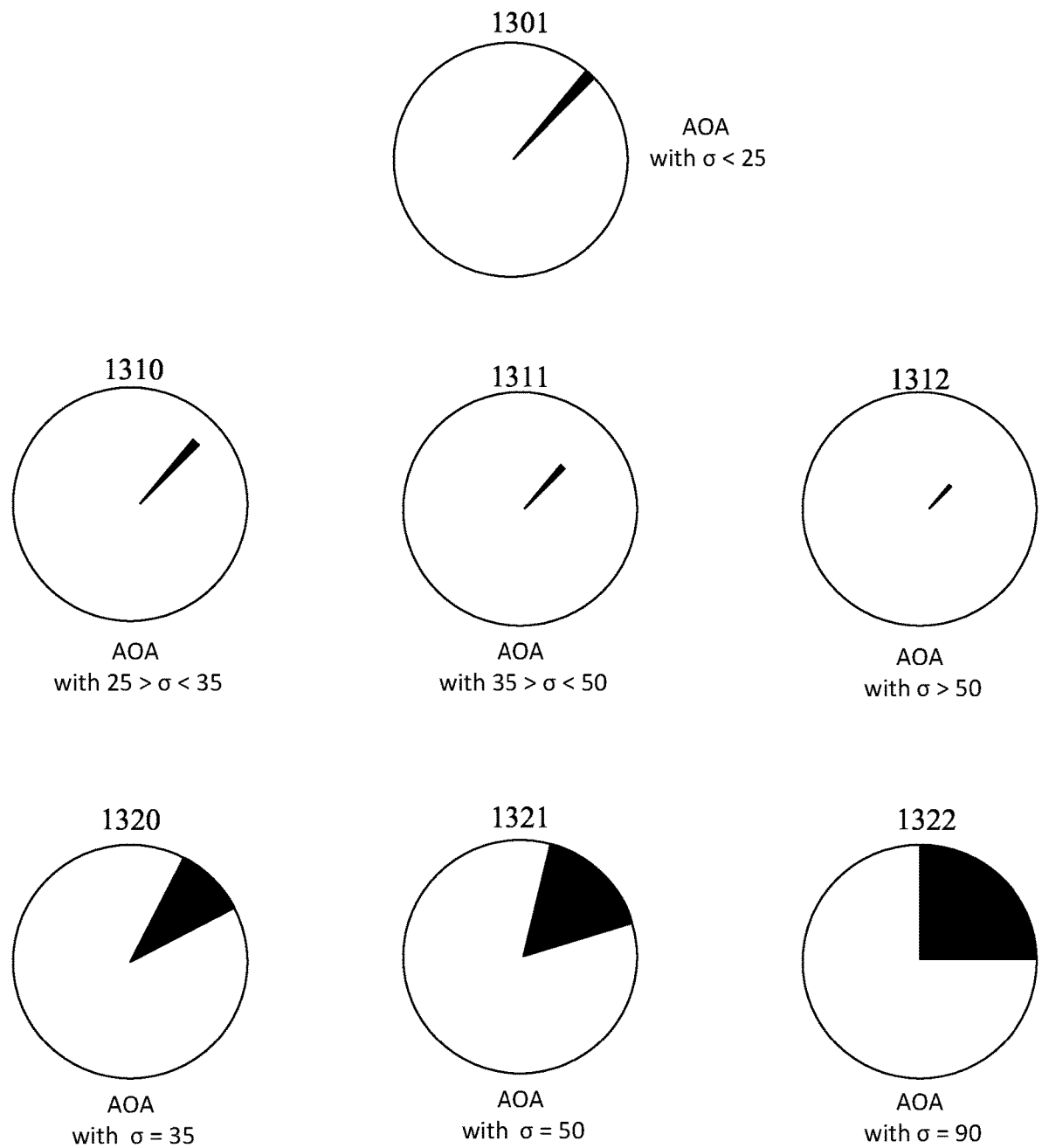
FIG. 13 is a graphical representation of examples of AOAs displayed to a user that indicate confidence.

FIG. 13 is a graphical representation of examples of AOAs displayed to an operator, that indicate confidence. Display 1301 depicts an AOA that corresponds to a standard deviation of less than 25, i.e., an AOA with good confidence. It may be displayed as a full length narrow line pointing in the direction of the AOA. For example, the line may have a beamwidth of 15 degrees, corresponding to the beam width of an SBA antenna. Example displays 1310, 1311 and 1312 depict AOAs displayed as a narrow line but where the length is inversely proportional to the standard deviation. For a standard deviation that is greater than 25 but less than 35, the direction line may be reduced to, for example, 75%, as shown in display 1310. For a standard deviation that is greater than 35 but less than 50, the direction line may be reduced to, for example, 50%, as shown in display 1311. For a standard deviation that is greater than 50, the direction line may be reduced to, for example, 25%, as shown in display 1312. Alternatively, the vector length may be continuously variable with a standard variation of 90 degrees being, say, of length 10%, and a standard variation of 25 degrees or less being length 100%.

Example displays 1320, 1321 and 1322 depict AOAs displayed with a width that corresponds to the calculated standard deviation. For example, display 1320 corresponds to a standard deviation of 35 degrees and hence, the sector is 35 degrees wide. Similarly display 1321 is 50 degrees wide and display 1322 is 90 degrees wide, corresponding to standard deviations of 50 and 90 degrees, respectively. A combination of the two methods may be used, i.e., a line that varies in both length and width. A short wide vector indicates poor confidence, and a narrow long vector indicates high confidence.

An operator using such an AOA vector display can easily observe the high confidence indications, either full length vectors or narrow, e.g., something smaller than full length, vectors, and is able to make decisions as to the direction of the target STA B 105 at various points along the route.

Figure 14:
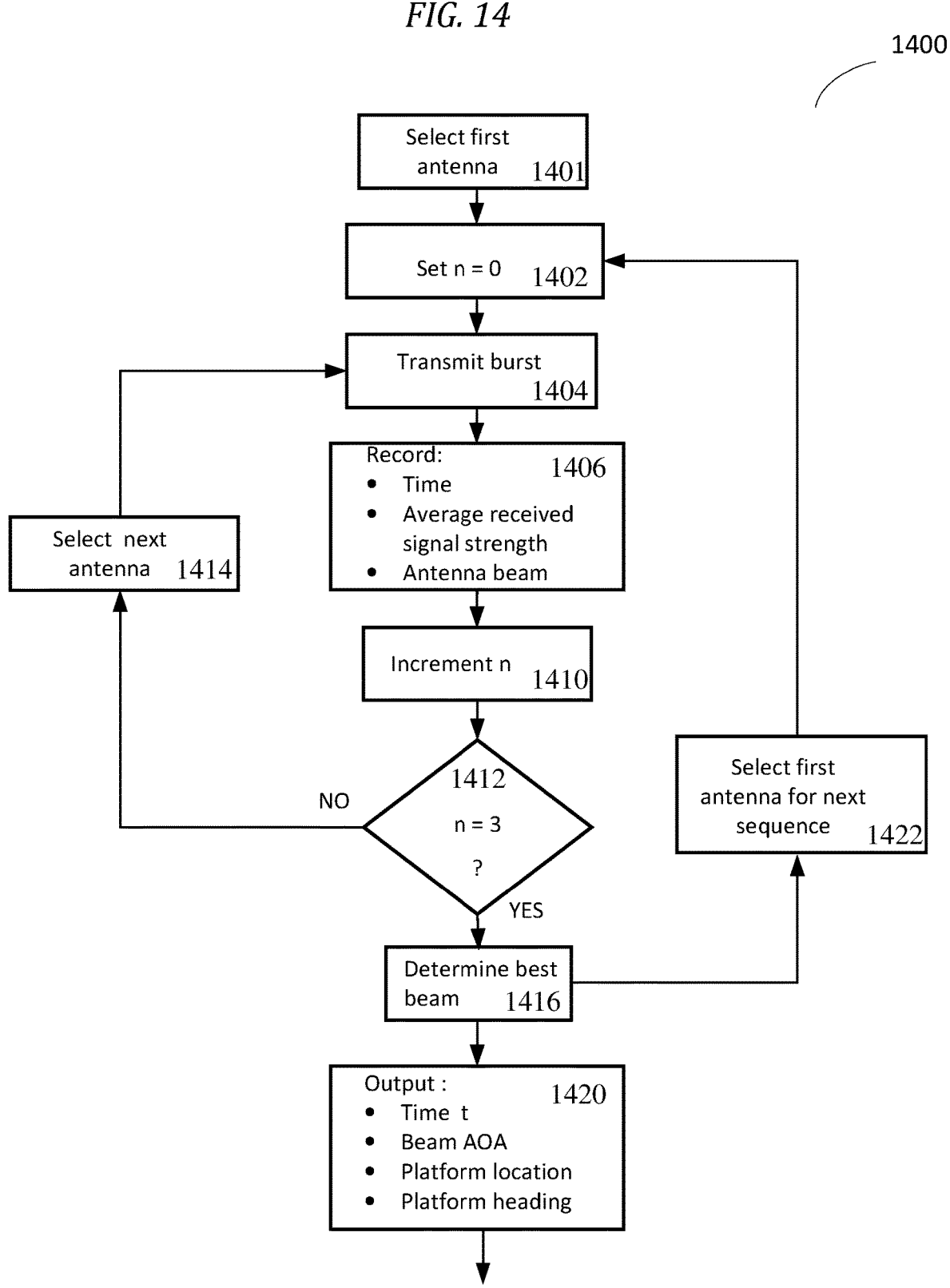
FIG. 14 is an example flow diagram of the outline of an example process of one embodiment for determining the AOA from a Wi-Fi device using a wireless communication device that includes an SBA.

FIG. 14 is an example flow diagram of the outline of an example process 1400 of one embodiment for determining the AOA from a Wi-Fi device using a wireless communication device 700 that includes an SBA 200. The basic method using an SBA to measure AOA is discussed above with reference to FIGS. 4, 5 and 6. The process 1400 is provided in order to provide a more complete understanding of the present disclosure. This process is assumed as the basis for the timing and parameter settings used in some embodiments disclosed herein.

At step 1401, the first antenna is selected. For example, at step 1401, with reference to FIG. 6, beam 508, may be selected. At step 1402 a variable n may be initialized and at step 1404 a burst 351 of transmissions of ranging packet 112 are sent, as described above with reference to FIG. 3. At step 1406, the signal strengths of all response packets 124 received in response to the burst 351 are averaged and recorded together with the corresponding selected antenna beam. At step 1410, the variable n is incremented. A check on the value of n is then carried out at step 1412, and if less than 3, the next antenna beam is selected at step 1414 and the process returns to step 1504 where a new burst 351 of transmissions of packet 112 are sent. In the example referenced in FIG. 6, then the selection sequence of antenna beams is 508, 510, and 512. If, at step 1412, n=3, then a burst 351 of transmissions of packet 112 has been sent on three antenna beams and at step 1416, the antenna beam with the best signal strength, the AOA, may be determined and at step 1420 the AOA may be output together with the time t, the heading and location of the wireless communication device 700, STA A 100. The AOA reported at step 1420 is relative to the heading of the wireless communication system 700. The process continues via step 1422 where the first antenna for the next sequence of antenna beam selection takes place. As discussed above with reference to FIGS. 4, 5 and 6, the next sequence is dependent upon the best beam selected at step 1416. If the center beam was the strongest, then the same antenna sequence is repeated. If the −30° antenna was the strongest, then the antenna sequence is shifted −15°, and if the +30° antenna was the strongest then the antenna sequence is shifted +15°. Hence, after three bursts 351, transmitted on each of the three antennas spaced at 30°, an AOA is output together with the location and heading of the wireless communication system 700. The control of the SBA antenna selection may be performed by the SBA control unit 723 via data bus 795. The bursts 351 of ranging packets 112 may be transmitted by wireless transmitter 710 via the selected antenna in SBA 200. The received signal strength of each response packet 124 may be derived by the RF receiver 752 and the processing circuitry 754 and the results sent to the SBA control unit 723 via the data bus 795. The location and heading of the wireless communication system 700 may be supplied by the platform location unit 760.

The process described in FIG. 14 results in a maximum rate of an AOA being produced for every three bursts of ranging packets, a rate of about 10 per second.

Figure 15:
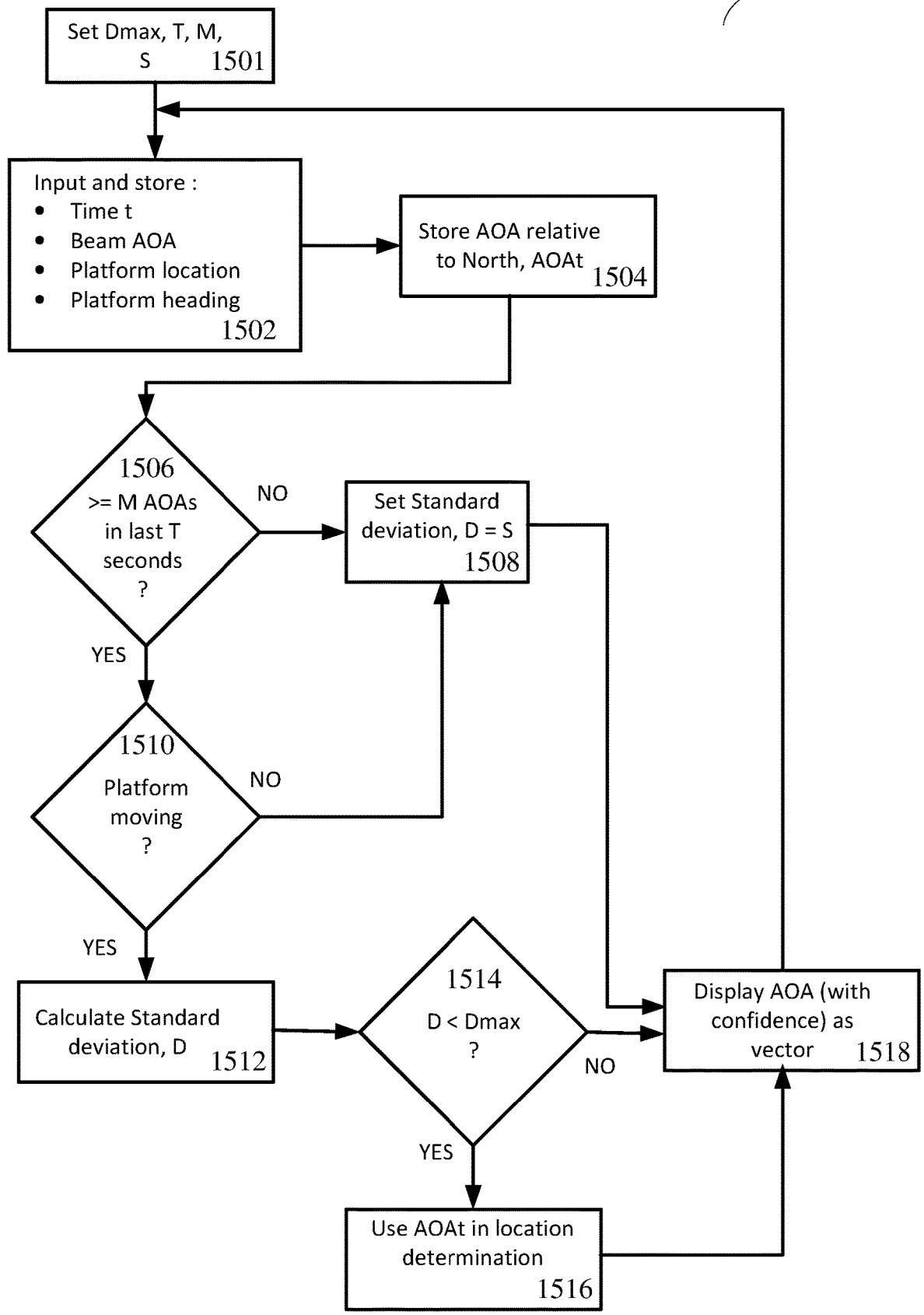
FIG. 15 is a flow diagram of an example process of one embodiment for determining if the AOAs from a Wi-Fi device, using a wireless communication device (STA A) that includes an SBA, are reliable.

FIG. 15 is a flow diagram of an example process 1500 of one embodiment for determining if the AOAs from a Wi-Fi device, using a wireless communication device 700 (STA A 100) that includes an SBA 200, are reliable. Process 1500 may start at step 1501 where parameters T, Dmax, M and S may be set. T is the duration in seconds over which the standard deviation of AOAs is calculated. Dmax is the maximum standard deviation accepted for an AOA to be considered reliable, and S is a standard deviation (high) value that is set for unreliable AOAs. These values may be preset or may be entered by a user via the keyboard/mouse 791 of the computer system 780. Example values are T=3 seconds, Dmax=25 degrees, M=4 which are parameters based upon the example process as discussed above with reference to FIG. 14. An example value for S is 90 degrees.

At step 1502, the measured AOA, together with the time t, and the location and heading are inputted and stored. For example, this data may be inputted from step 1420 in FIG. 14. In the general sense, assuming that the wireless communication system 700 is mounted in an automotive vehicle, then the SBA 200 would be mounted, either internally or on the roof, with the zero degree beam 501 in the forward direction of the vehicle. The reported AOA is therefore relative to the direction of the vehicle. In step 1504, the AOA relative to north (AOAt) is stored. The AOAt recorded at step 1504 would be the heading of the vehicle, as reported by the platform location unit 760, plus the AOA inputted at step 1502.

At step 1506, it is determined if in the last T seconds there have been M or more AOAs inputted. For example, if T=3 and M=4, then at step 1506 it is checked if, including the present AOA, there are at least 4 AOAs stored over the last 3 seconds. If so, then at step 1510 it is checked if the wireless communication device 700 (STA A 100) is moving. The determination of movement may be carried out directly by platform location unit 760. Movement may be assumed if the reported speed is more than 1 meter per second. If at step 1510 it is determined that the wireless communication device 700 (STA A 100) is moving, then at step 1512 the standard deviation of all the AOAt received over the last T seconds, is calculated. The standard deviation may be calculated using equations (1), (2), (3), and (4), or using the alternative method described in equations (5), (6) and (7) or (8), (9) and (7). Each AOAt may be stored in database 788 together with the time, and the heading and location of the wireless communications device 700 (STA A 100). The standard deviation calculations may be processed in processing circuitry 782 of the computer system 780. At step 1514 it is checked if the standard deviation is less than Dmax. If it is, then the AOAt is considered to be accurate and it is used in the calculations used to determine the location of the target, STA B 105. The location calculations may be processed in processing circuitry 782 and displayed to the user via the display 790. At step 1518, the direction of the AOA is displayed as a vector. In this case, as the standard deviation D is less than Dmax, the direction vector displayed is with high confidence, as discussed above with reference to FIG. 13. The AOA displayed is the AOA inputted at step 1502 and is the AOA with respect to the heading of the wireless communications device 700 (STA A 100). The process then returns to step 1502.

If, at step 1506 it is determined that in the last T seconds there have been less than M AOAs inputted, or at step 1510 it is determined that wireless communications device 700 (STA A 100) is not moving, then at step 1508, the standard deviation for that AOAt is set to a value S. For example, if T=3, M=4, and S=90, then at step 1506 it is checked if, including the present AOA, there are less than 4 AOAs stored over the last 3 seconds and if so, then the standard deviation for that AOAt is set to 90 degrees. In this case AOAt is not used in the location determination (step 1516) but at step 1518, the direction of the AOA is displayed as a vector. In this case, as the standard deviation D is set to S the direction vector displayed is with low confidence, as discussed above with reference to FIG. 13. The AOA displayed is the AOA inputted at step 1502 and is the AOA with respect to the heading of the wireless communications device 700 (STA A 100). If at step 1514, the standard deviation is calculated to be greater than Dmax, then at step at step 1518, the direction of the AOA is displayed as a vector. In this case, as discussed above with reference to FIG. 13, the confidence of the direction vector is displayed in inverse proportion to the measured standard deviation. The vector is produced in processing circuitry 782 and presented to the user on display 790.

Process 1500 filters the incoming AOAs for confidence in accuracy. The method used is to calculate the deviation of AOAs over a time period T and if the deviation is less than a fixed value, Dmax, then it is assumed that the AOA is accurate and usable. Also, checks are made that there are a sufficient number, M, of AOAs in that time period T and that the wireless communications device 700 (STA A 100) was moving at the time the AOA was reported.

Figure 16:
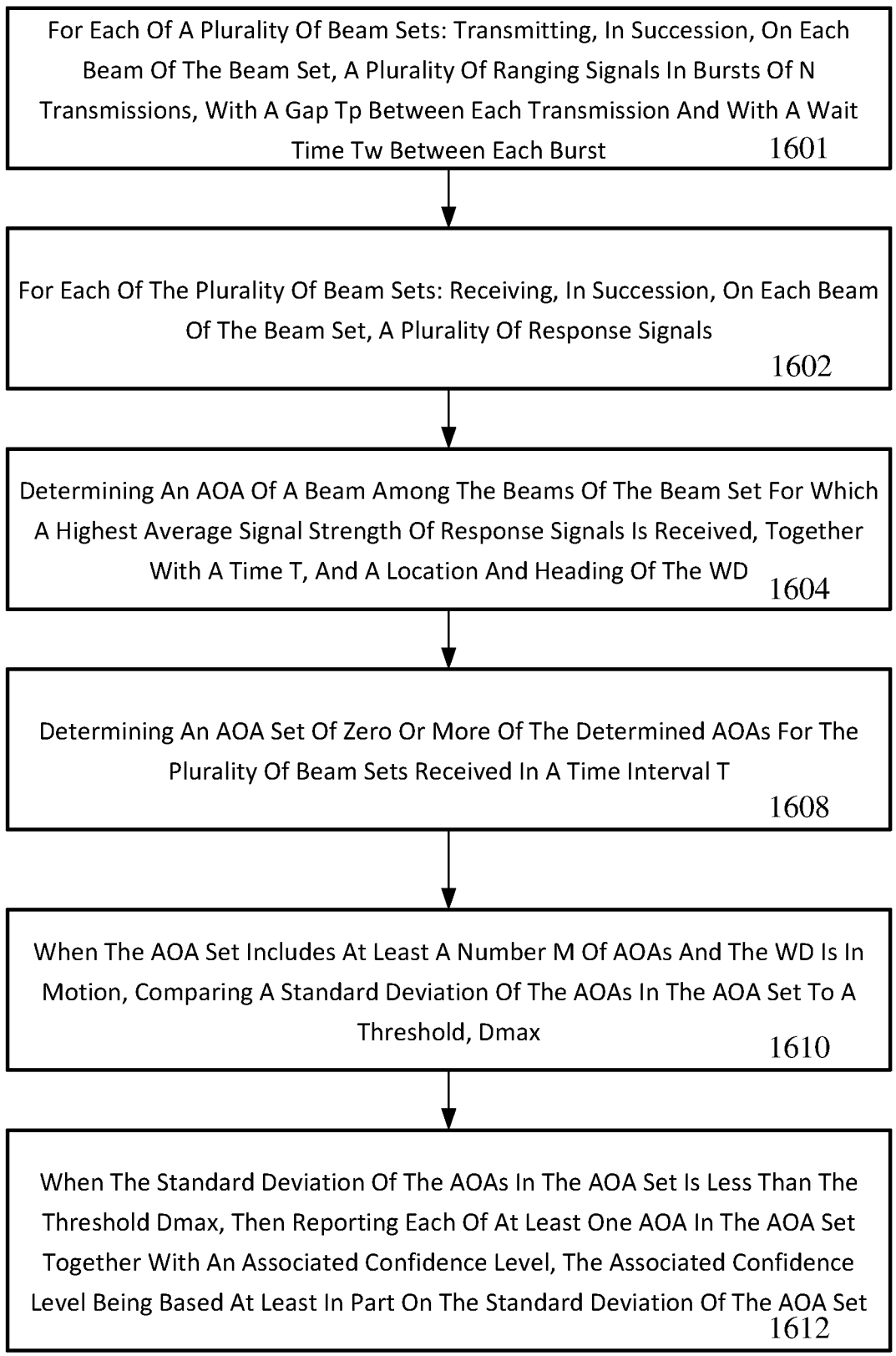
FIG. 16 is a flow diagram of another example process of an embodiment for determining if the AOAs from a Wi-Fi device, using a wireless communication device (STA A) that includes an SBA, are reliable.

FIG. 16 is a flow diagram of an example process of one embodiment for determining if the AOAs from a Wi-Fi device, using a wireless communication device 700 (STA A 100) that includes an SBA 200. The process may be performed by a STA 100, via transmitter 710 and receiver 750, including processing circuitry 720 and 754. The process includes, for each of a plurality of beam sets: transmitting, in succession, on each beam of the beam set, a plurality of ranging signals in bursts of N transmissions, with a gap Tp between each transmission and with a wait time Tw between each burst (step 1601); receiving, in succession, on each beam of the beam set, a plurality of response signals (step 1602); and determining an AOA of a beam among the beams of the beam set for which a highest average signal strength of response signals is received, together with a time t, and a location and heading of the WD (step 1604). The process includes determining an AOA set of zero or more of the determined AOAs for the plurality of beam sets received in a time interval T (step 1608). The process includes when the AOA set includes at least a number M of AOAs and the WD is in motion, comparing a standard deviation of the AOAs in the AOA set to a threshold, Dmax (step 1610). The process further includes, when the standard deviation of the AOAs in the AOA set is less than the threshold Dmax, then reporting each of at least one AOA in the AOA set together with an associated confidence level, the associated confidence level being based at least in part on the standard deviation of the AOA set (step 1612).

In some embodiments, the process includes causing display of a vector in a direction of a reported AOA, a length of the vector depending at least in part the confidence level associated with the reported AOA. In some embodiments, the process includes causing display of a sector in a direction of a reported AOA, an angular width of the sector depending at least in part on the confidence level associated with the reported AOA. In some embodiments, the method includes, when the AOA set includes less than the number M of AOAs, or the WD is not in motion, or the standard deviation of the AOAs in the AOA set is not less than the threshold Dmax, not using any AOA in the AOA set to determine a location of the WD. In some embodiments, the standard deviation of the AOAs in the AOA set is determined based at least in part on an average value of a square of the cosines of the AOAs in the AOA set and an average value of squares of the sines of the AOAs in the AOA set. In some embodiments, the standard deviation of the AOAs in the AOA set is determined based at least in part on a sum of squares of differences between each AOA in the AOA set and an average AOA, the average AOA being based at least in part on a sign of a sum of the sines of the AOAs in the AOA set and a sign of a sum of the cosines of the AOAs in the AOA set. In some embodiments, the average AOA is an angle whose tangent is a ratio of the sum of sines to the sum of cosines, offset by an amount, $-\pi$, when the sum of the sines of the AOAs and the sum of the cosines of the AOAs are both negative, and the average AOA is an angle whose tangent is a ratio of the sum of the sines to the sum of cosines, offset by an amount, $+\pi$, when the sum of the sines of the AOAs is positive and the sum of the cosines of the AOAs is negative. In some embodiments, the standard deviation of the AOAs in the AOA set is based at least in part on a sum of squares of cosines of the AOAs in the AOA set minus a square of a sum of the cosines of the AOAs in the AOA set. In some embodiments, the number N of transmissions in a burst, the gap Tp between each transmission of the N transmissions, and the wait time Tw between each burst are configured to enable a determination of a target number of AOAs within the time interval T. In some embodiments, the number M and the time interval T are configured based at least in part on an expected changed in AOA due to movement of the WD. In some embodiments, the WD is deemed to be stationary when the WD has a velocity that falls below a non-zero level.

As will be appreciated by one of skill in the art, the details of the SBA, i.e., the number of antennas and the beamwidths, may vary, but the underlying antenna beam selection sequence is the same, based upon the sending of bursts of ranging packets 112 on one of a selection of three antennas and selecting the antenna with the highest average received signal strength as the AOA. It will also be appreciated by one of skill in the art that variations in the selection of the values for T, M, Dmax, and S are possible with minor changes in the results.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "unit." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the number of transmissions in a burst, the time between transmissions within a burst, the wait time between bursts, the number of antennas in the SBA, the beam widths of the antennas in the SBA, the time period over which the AOA deviations are measured, the value of the maximum deviation, the method of calculating the deviation, the number of AOAs required in order to make a valid deviation calculation, the details of the vector display using deviation as a confidence criteria. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method, implemented in a first wireless device (WD), for determining a confidence in angles of arrival (AOAs) corresponding to communication between the first wireless device and a second wireless device using a switched beam antenna (SBA), the method comprising:
    for each of a plurality of beam sets:
        transmitting, in succession, on each beam of the beam set, a plurality of ranging signals in bursts of N transmissions, with a gap Tp between each transmission and with a wait time Tw between each burst;
        receiving, in succession, on each beam of the beam set, a plurality of response signals; and
        determining an AOA of a beam among the beams of the beam set for which a highest average signal strength of response signals is received, together with a time t, and a location and heading of the WD; and
    determining an AOA set of zero or more of the determined AOAs for the plurality of beam sets received in a time interval T;
    determining that the AOA set includes at least a number M of AOAs and that the WD is in motion, where M is greater than or equal to four;
    comparing a standard deviation of the AOAs in the AOA set to a threshold, Dmax;
    determining that the standard deviation of the AOAs in the AOA set is less than the threshold Dmax, and reporting each of at least one AOA in the AOA set together with an associated confidence level, the associated confidence level being based at least in part on the standard deviation of the AOA set.

2. The method of claim 1, further comprising causing display of a vector in a direction of a reported AOA, a length of the vector depending at least in part the confidence level associated with the reported AOA.

3. The method of claim 1, further comprising causing display of a sector in a direction of a reported AOA, an angular width of the sector depending at least in part on the confidence level associated with the reported AOA.

4. The method of claim 1, further comprising, when the AOA set includes less than the number M of AOAs, or the WD is not in motion, or the standard deviation of the AOAs in the AOA set is not less than the threshold Dmax, not using any AOA in the AOA set to determine a location of the WD.

5. The method of claim 1, wherein the standard deviation of the AOAs in the AOA set is determined based at least in part on an average value of a square of the cosines of the AOAs in the AOA set and an average value of squares of the sines of the AOAs in the AOA set.

6. The method of claim 5, wherein the standard deviation of the AOAs in the AOA set is determined based at least in part on a sum of squares of differences between each AOA in the AOA set and an average AOA, the average AOA being based at least in part on a sign of a sum of the sines of the AOAs in the AOA set and a sign of a sum of the cosines of the AOAs in the AOA set.

7. The method of claim 6, wherein the average AOA is an angle whose tangent is a ratio of the sum of sines to the sum of cosines, offset by an amount, $-\pi$, when the sum of the sines of the AOAs and the sum of the cosines of the AOAs are both negative, and the average AOA is an angle whose tangent is a ratio of the sum of the sines to the sum of cosines, offset by an amount, $+\pi$, when the sum of the sines of the AOAs is positive and the sum of the cosines of the AOAs is negative.

8. The method of claim 5, wherein the standard deviation of the AOAs in the AOA set is based at least in part on a sum of squares of cosines of the AOAs in the AOA set minus a square of a sum of the cosines of the AOAs in the AOA set.

9. The method of claim 1, wherein the number N of transmissions in a burst, the gap Tp between each transmission of the N transmissions, and the wait time Tw between each burst are configured to enable a determination of a target number of AOAs within the time interval T.

10. The method of claim 1, wherein the number M and the time interval T are configured based at least in part on an expected changed in AOA due to movement of the WD.

11. The method of claim 1, wherein the WD is deemed to be stationary when the WD has a velocity that falls below a non-zero level.

12. A first wireless device (WD) configured to determine a confidence in angles of arrival (AOA) corresponding to communication between the first wireless device and a second wireless device using a switched beam antenna (SBA), the first wireless device comprising:
    a radio transmitter and receiver configured to: for each of a plurality of beam sets:
        transmit, in succession, on each beam of the beam set, a plurality of ranging signals in bursts of N transmissions, with a gap Tp between each transmission and with a wait time Tw between each burst; and
        receive, in succession, on each beam of the beam set, a plurality of response signals; and
    processing circuitry configured to:
        for each of the plurality of beam sets, determine an AOA of a beam among the beams of the beam set for which a highest average signal strength of response signals is received, together with a time t, and a location and heading of the WD; and
        determine an AOA set of zero or more of the determined AOAs for the plurality of beam sets received in a time interval T;
        when the AOA set includes at least a number M of AOAs and the WD is in motion, compare a standard deviation of the AOAs in the AOA set to a threshold, Dmax, where M is greater than or equal to four; and
        when the standard deviation of the AOAs in the AOA set is less than the threshold Dmax, report each of at least one AOA in the AOA set together with an associated confidence level, the associated confidence level being based at least in part on the standard deviation of the AOA set.

13. The first WD of claim 12, wherein the processing circuitry is further configured to cause display of a vector in a direction of a reported AOA, and a length of the vector depending at least in part the confidence level associated with the reported AOA.

14. The first WD of claim 12, wherein the processing circuitry is further configured to cause display of a sector in a direction of a reported AOA, an angular width of the sector depending at least in part on the confidence level associated with the reported AOA.

15. The first WD of claim 12, wherein the processing circuitry is further configured to, when the AOA set includes less than the number M of AOAs, or the WD is not in motion, or the standard deviation of the AOAs in the AOA set is not less than the threshold Dmax, not using any AOA in the AOA set to determine a location of the WD.

16. The first WD of claim 12, wherein the standard deviation of the AOAs in the AOA set is determined based at least in part on an average value of squares of the cosines of the AOAs in the AOA set and an average value of squares of the sines of the AOAs in the AOA set.

17. The first WD of claim 16, wherein the standard deviation of the AOAs in the AOA set is determined based at least in part on a sum of squares of differences between each AOA in the AOA set and an average AOA, the average AOA being based at least in part on a sign of a sum of the sines of the AOAs in the AOA set and a sign of a sum of the cosines of the AOAs in the AOA set.

18. The first WD of claim 17, wherein the average AOA is an angle whose tangent is a ratio of the sum of sines to the sum of cosines, offset by an amount, $-\pi$, when the sum of the sines of the AOAs and the sum of the cosines of the AOAs are both negative, and the average AOA is an angle whose tangent is a ratio of the sum of the sines to the sum of cosines, offset by an amount, $+\pi$, when the sum of the sines of the AOAs is positive and the sum of the cosines of the AOAs is negative.

19. The first WD of claim 16, wherein the standard deviation of the AOAs in the AOA set is based at least in part on a sum of squares of cosines of the AOAs in the AOA set minus a square of a sum of the cosines of the AOAs in the AOA set.

20. The first WD of claim 12, wherein the number N of transmissions in a burst, the gap Tp between each transmission of the N transmissions, and the wait time Tw between each burst are configured to enable a determination of a target number of AOAs within the time interval T.

21. The first WD of claim 12, wherein the number M and the time interval T are configured based at least in part on an expected changed in AOA due to movement of the WD.

22. The first WD of claim 12, wherein the WD is deemed to be stationary when the WD has a velocity that falls below a non-zero level.

* * * * *